(12) United States Patent
Lopez et al.

(10) Patent No.: US 7,959,849 B2
(45) Date of Patent: Jun. 14, 2011

(54) METHOD FOR APPLYING A LAYER OF MATERIAL INSIDE A CYCLE TYRE

(75) Inventors: José Merino Lopez, Riom (FR); Luc Bestgen, Chatel-Guyon (FR); Frédéric Pialot, Moissat (FR)

(73) Assignees: Societe de Technologie Michelin, Clermont-Ferrand (FR); Michelin Recherche et Technique, S.A., Granges-Paccot (CH)

( * ) Notice: Subject to any disclaimer, the term of this patent is extended or adjusted under 35 U.S.C. 154(b) by 0 days.

(21) Appl. No.: 12/666,410

(22) PCT Filed: Jun. 19, 2008

(86) PCT No.: PCT/EP2008/057798
§ 371 (c)(1),
(2), (4) Date: Jun. 1, 2010

(87) PCT Pub. No.: WO2009/000744
PCT Pub. Date: Dec. 31, 2008

(65) Prior Publication Data
US 2010/0230865 A1    Sep. 16, 2010

(30) Foreign Application Priority Data
Jun. 28, 2007 (FR) .................................. 07 04639

(51) Int. Cl.
*B29D 30/00* (2006.01)
(52) U.S. Cl. ............... 264/501; 264/510; 156/110.1; 152/502; 152/503; 152/504; 152/505; 152/506; 152/509
(58) Field of Classification Search .............. 152/502, 152/503, 504, 505, 506, 509
See application file for complete search history.

(56) References Cited

U.S. PATENT DOCUMENTS

| 1,373,834 | A | | 4/1921 | Rogers |
| 3,000,615 | A | | 9/1961 | Alm |
| 4,359,078 | A | * | 11/1982 | Egan ............................ 152/504 |
| 4,424,295 | A | | 1/1984 | Van Ornum et al. .......... 524/526 |
| 4,426,468 | A | | 1/1984 | Ornum .......................... 523/166 |
| 2003/0150544 | A1 | | 8/2003 | Naito et al. ................... 156/115 |
| 2008/0264538 | A1 | | 10/2008 | Merino-Lopez ........... 152/339.1 |
| 2008/0264539 | A1 | | 10/2008 | Merino-Lopez et al. .. 152/341.1 |

FOREIGN PATENT DOCUMENTS

| EP | 0 102 844 A2 | 3/1984 |
| EP | 1 034 948 A2 | 9/2000 |
| EP | 1 798 257 A1 | 6/2007 |
| GB | 09472 | 3/1898 |
| JP | 2001-018609 A | 1/2001 |
| WO | WO 99/62998 A1 | 12/1999 |

* cited by examiner

*Primary Examiner* — Monica A Huson
(74) *Attorney, Agent, or Firm* — Fitzpatrick, Cella, Harper & Scinto

(57) ABSTRACT

Method of applying a layer of material (25, 26) to the inner wall of a cycle tyre (20) in the form of a torus, with an inner wall (28) and an outer wall (29) and having a crown (22) extended by two sidewalls (21), two beads (23a, 23b) and two bead wires (30a, 30b) placed in said beads, said tyre having a given nominal inflation pressure, which comprises the following steps:
  the tyre (20) is turned inside-out so as to bring the inner wall (28) to the outside of the torus and the outer wall (29) to the inside of the torus;
  the outer torus wall (29) of the tyre is extended by applying an internal inflation pressure to said outer wall (29) above the nominal inflation pressure of said tyre;
  the layer of material (25, 26) is applied to the inner wall (28) of the tyre (20); and
  the tyre (20) is turned inside-out so as to bring the inner wall (28) and the outer wall (29) back into their initial positions.

8 Claims, 4 Drawing Sheets

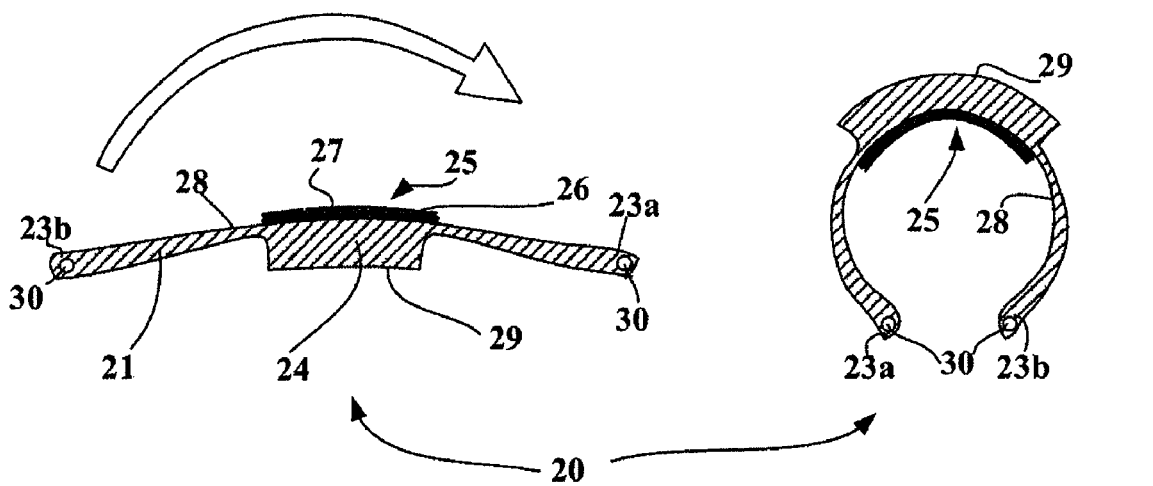
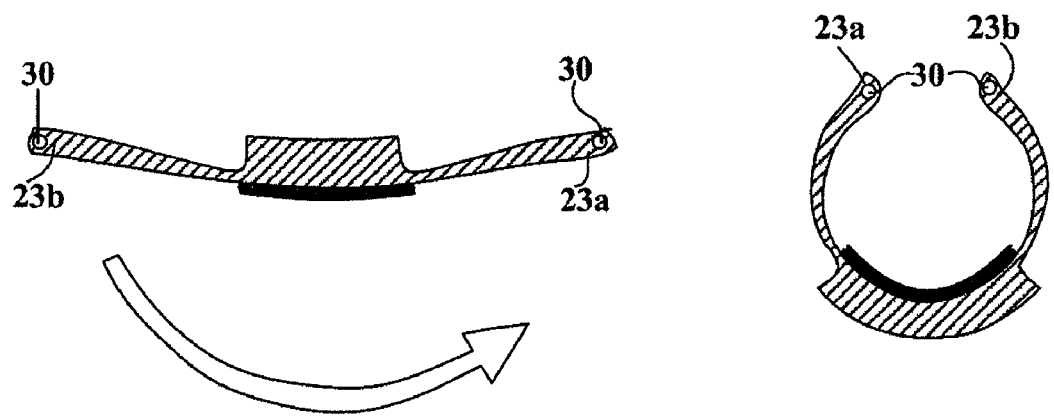
Fig. 8                    Fig. 9

US 7,959,849 B2

METHOD FOR APPLYING A LAYER OF MATERIAL INSIDE A CYCLE TYRE

FIELD OF THE INVENTION

The present invention relates to a tubeless cycle tyre that includes a self-sealing layer placed on its inner wall so as to seal off any perforations in service and more particularly to the method of applying such a layer of material inside the cycle tyre.

TECHNOLOGICAL BACKGROUND

The problem of punctures, namely that of how to allow a vehicle to continue its travel despite a substantial or complete loss of pressure of one or more of its tyres or how to avoid an air leakage after a perforation, dates back from the very start of the use of wheels fitted with inflated tyres.

One solution very often proposed is to add a self-sealing layer to the inner wall of the tyre.

Document U.S. Pat. No. 4,426,468 shows an example of a cycle tyre that includes a self-sealing layer on its inner wall. However, because of the very high flexibility of such a tyre, this document emphasizes that it is very difficult to deposit a layer of self-sealing product on the inside of a cycle tyre after vulcanization, and proposes to place this layer between an airtight inner liner and the carcass ply before vulcanization.

DESCRIPTION OF THE INVENTION

The subject of the invention is a method of applying a layer of material to the inner wall of a cycle tyre in the form of a torus, with an inner wall and an outer wall and having a crown extended by two sidewalls, two beads and two bead wires placed in the beads, the tyre having a given nominal inflation pressure, which comprises the following steps:

the tyre is turned inside-out so as to bring the inner wall to the outside of the torus and the outer wall to the inside of the torus;

the outer torus wall of the tyre is extended by applying an internal inflation pressure to said outer wall above the nominal inflation pressure of said tyre;

the layer of material is applied to the inner wall of the tyre; and the tyre is turned inside-out so as to bring the inner wall and the outer wall back into their initial positions.

In a preferred embodiment, since the tyre has a given nominal inflation pressure of around 2 bar for a tubeless tyre, the internal pressure is between 3 and 8 bar.

Advantageously, a cleaning operation is carried out on the inner wall of the tyre before the layer of material is applied.

The layer of material may be applied by direct extrusion of the material in the form of a skim or of a strip onto the wall of the tyre.

The method according to the invention is particularly suitable for placing a self-sealing layer or a self-sealing laminate comprising a layer of self-sealing material coated with an extensible thermoplastic film.

The self-sealing layer is thus very advantageously in a state of compressive stress, which contributes to good self-sealing.

Other features and advantages of the invention will become apparent from the following description given with reference to the appended drawings which show, as non-limiting examples, embodiments of the invention.

BRIEF DESCRIPTION OF THE DRAWINGS

All the embodiment details are given in the following description, corresponding to the application of a self-sealing layer or a self-sealing laminate, which is supplemented by FIGS. 1 to 9 in which:

FIG. 8 shows the tyre of FIG. 7 being brought back the right way round; and

FIG. 9 shows the tyre of FIG. 8 brought back the right way round.

DETAILED DESCRIPTION OF THE INVENTION

Figure 1:
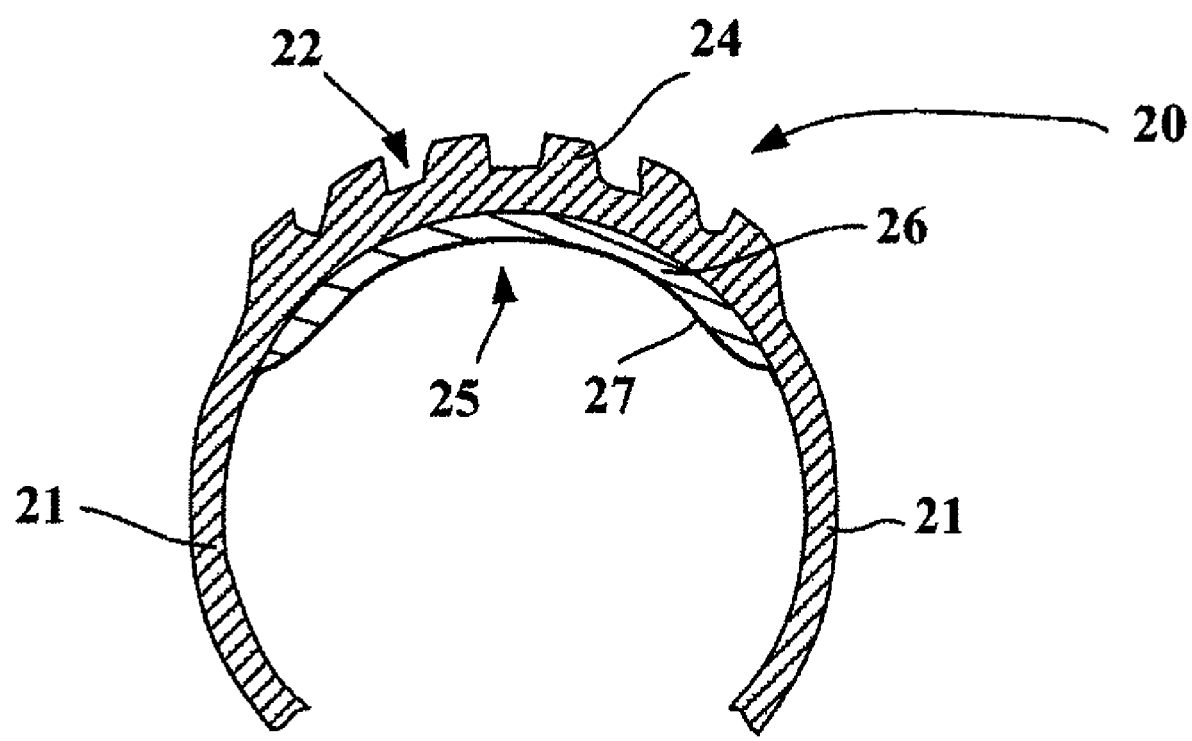
FIG. 1 shows a partial radial cross section of a cycle tyre incorporating a self-sealing laminate.

FIG. 1 illustrates a cycle tyre that includes a self-sealing laminate.

This tyre 20 comprises a crown 22 extended by two sidewalls 21 and two beads 23a and 23b. A carcass reinforcement (not shown) extends from one bead to the other in the sidewalls and the crown. A tread 24 is placed on the carcass reinforcement at the crown. This tyre includes a self-sealing laminate 25. This laminate 25 consists of a self-sealing layer 26 covered with an extensible thermoplastic film 27. The extensible thermoplastic film is in contact with the air of the internal cavity of the tyre. The laminate 25 extends substantially only around the crown 22 of the tyre 20.

The application of a self-sealing laminate according to the invention on the inner wall of a cycle tyre will now be described in conjunction with FIGS. 2 to 9. As emphasized in the cited patent U.S. Pat. No. 4,424,295, it is very difficult to deposit, after vulcanization, a layer of self-sealing product on the inside of a cycle tyre because of the very great flexibility of this type of tyre. The method according to the invention makes it possible for such an application to be easily carried out.

Figure 2:
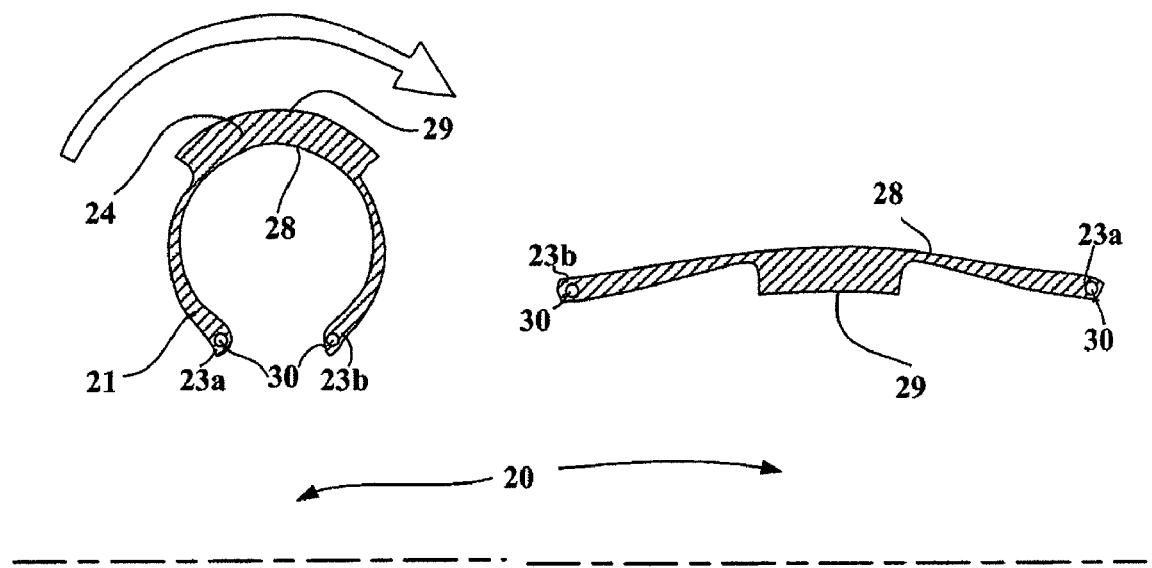
FIG. 2 shows the first step of applying a self-sealing layer to a cycle tyre.
Figure 2:
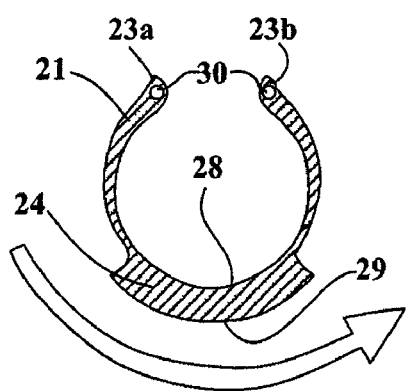

FIG. 2 illustrates the first step of the method of application according to the invention, for applying a self-sealing laminate to a cycle tyre. This tyre 20 comprises, in particular, two sidewalls 21 and a tread 24, and has an inner wall 28 and an outer wall 29. The first step consists in turning the tyre inside out so that the inner wall 28 is on the outside of the tyre and the outer wall 29 on the inside. The turning-inside-out operation also results in the two beads 23a and 23b being in an axially reversed position, as indicated in FIGS. 2 and 3, and may be carried out in the direction indicated by the arrows shown in FIG. 2.

This turning-inside-out operation is very easy in the case of a cycle tyre because of the very great flexibility in bending of the bead wires 30, which can be easily manipulated and folded without undergoing permanent deformation, while still remaining substantially inextensible so as to be able to anchor the beads in the wheel rim seats. This turning-inside-out operation may be carried out manually.

Figure 3:
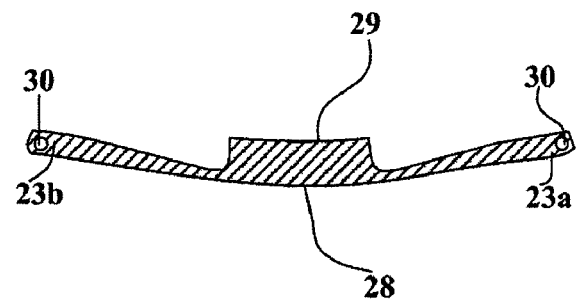
FIG. 3 illustrates a cycle tyre after being turned inside out.
Figure 4:
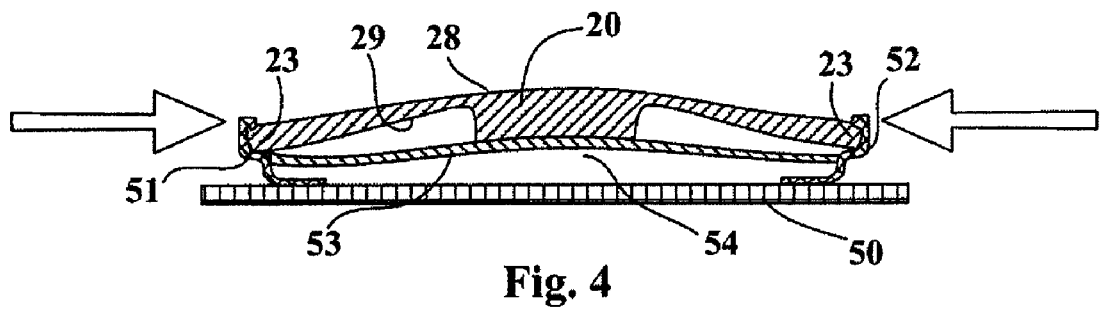
FIG. 4 illustrates an inside-out cycle tyre placed on an inflation drum.

FIG. 3 shows the tyre 20 turned inside-out.

Next, the inside-out tyre 20 is placed on an inflating drum 50 (illustrated schematically in FIG. 4) having two flanges 51 and 52 designed to accommodate the beads 23 of the tyre and a membrane 53 intended to seal the cavity 54 formed by the drum, the flanges and the membrane. The two bead wires 30 enable the two beads to be anchored on the flanges 51 and 52 and allow a high inflation pressure to be applied in the cavity 54.

Figure 5:
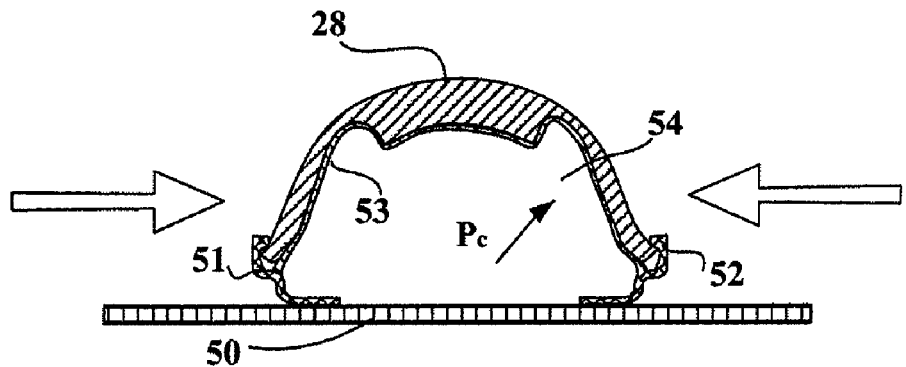
FIG. 5 shows the phase of inflating the inside-out tyre.

The cavity 54 is then inflated, while bringing the two flanges 51 and 52 closer together, as illustrated in FIG. 5. The internal pressure $P_c$ of the cavity 54 presses the membrane 53 against the outer wall 29 of the tyre. The two arrows of FIG. 5 show the direction of the axial movement bringing the two flanges 51, 52 closer together.

Figure 6:
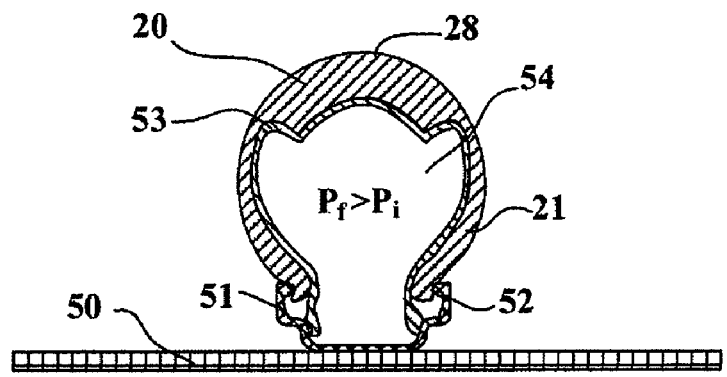
FIG. 6 shows the inflated inside-out cycle tyre.

In FIG. 6, the axial movement of bringing the two flanges 51 and 52 closer together is completed and the internal pressure in the cavity 54 is raised to a value $P_f$. Preferably, this pressure $P_f$ is substantially greater than the nominal inflation pressure of the tyre 20 so as to bring the carcass reinforcement of the tyre 20 to a state of extension greater than that normally undergone in service by the tyre.

This inflation pressure $P_f$ also has the advantage of giving the tyre 20 thus mounted inside-out an overall stiffness quite sufficient for being able to apply the self-sealing laminate 25 to the inner wall 28.

Just before the laminate 25 is applied, it is possible to carry out a cleaning operation on the tyre. This cleaning operation may be simple removal of dust, by brushing it, or may use water or any other substance and method that are appropriate.

Figure 7:
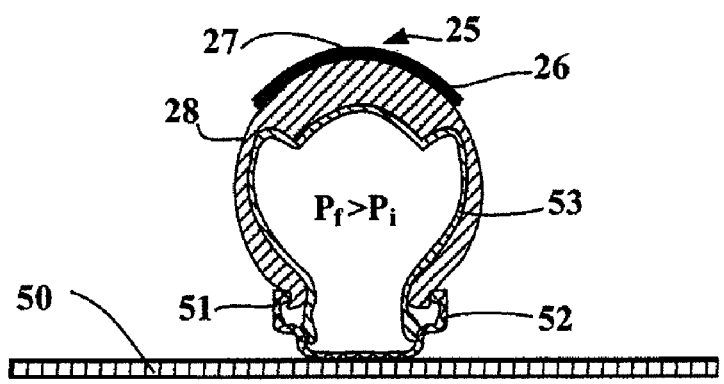
FIG. 7 shows the application of the self-sealing layer.

FIG. 7 shows the tyre 20 with a laminate 25 deposited on its inner wall 28. This laminate may have been produced beforehand by extrusion of a skim, to the desired width and thickness, and by deposition onto a protective film, for example a siliconized film, and wound in reels. During application to the tyre, a layer of the skim is wound around the tyre, stripping off the siliconized protective film during application of the skim and rotating the tyre. The thermoplastic film 27 is then applied.

Preferably, the thermoplastic film 27 is applied to the free wall of the skim before winding, in such a way that a reel of laminate is wound, ready for application to the tyre 20, this application taking place in a single operation.

The self-sealing layer may also be applied by winding a strip of thickness and width that are smaller than the desired dimensions.

Finally, the self-sealing material 26 can be extruded directly on the inner wall 28 of the tyre and the thermoplastic film 27 can then be wound up.

After the laminate 25 has been applied, the tyre is turned back the right way round, by a second turning-inside-out operation, as illustrated in FIG. 8. The tyre illustrated in FIG. 9 is then obtained.

It should be noted that the self-sealing layer 26 of the laminate 25, placed without any particular stress on the inner wall 28 of the inside-out tyre, inflated to $P_f$, is, after the turning-inside-out operation, in a state of compression linked to the taking-up of the normal shape of the tyre 20 and to the deflation of the cavity 54. This state of compression must be maintained when the tyre 20 is inflated to its nominal inflation pressure, since application took place with a pressure in the cavity 54 above this nominal inflation pressure $P_i$. This state of compression is very favourable to the effectiveness of the self-sealing layer 26 and the self-sealing laminate 25. When the nominal inflation pressure $P_i$ is 2 bar, the applied pressure may be up to 6 or even 8 bar.

The invention has been described by taking as example the application of a self-sealing layer or laminate, but it applies to any type of layer of material. In particular, it may be used for applying airtight layers, but also for easily fixing patches that include sensors for example.

The invention is not limited to the examples described and shown, and various modifications may be applied thereto without departing from its scope defined by the appended claims.

The invention claimed is:

1. A method of applying a layer of material to an internal wall of a cycle tyre, in which the tyre has a shape of a torus with an inner wall and an outer wall and includes a crown extended by two sidewalls, two beads, and two bead wires placed in the beads, the tyre having a given nominal inflation pressure, the method comprising:
    turning the tyre inside out so as to bring the inner wall to face outside of the torus and to bring the outer wall to face inside of the torus;
    applying an internal inflation pressure above the nominal inflation pressure of the tyre to the outer wall to extend the outer wall while the tyre is turned inside out;
    applying the layer of the material to the inner wall of the tyre while the internal inflation pressure applied to the outer wall is above the nominal inflation pressure of the tyre; and
    turning the tyre outside out so as to return the inner wall to face the inside of the torus and to return the outer wall to face the outside of the torus, such that the layer of the material is in a state of compression when the tyre is outside out, and such that the layer of the material stays in the state of compression when the tyre subsequently is inflated to the nominal inflation pressure.

2. The method according to claim 1, wherein the nominal inflation pressure is between 3 and 8 bar.

3. The method according to claim 1, further comprising: cleaning the inner wall of the tyre before the layer of the material is applied.

4. The method according to claim 1, wherein the applying of the layer of the material includes direct extrusion of the material onto the inner wall of the tyre.

5. The method according to claim 1, wherein the applying of the layer of the material includes direct extrusion of a strip of the material onto the inner wall of the tyre.

6. The method according to claim 1, wherein the tyre is a tubeless tyre.

7. The method according to claim 1, wherein the material is a self-sealing product.

8. The method according to claim 1, wherein the material is a self-sealing laminate that includes a layer of self-sealing material coated with an extensible thermoplastic film.

* * * * *